United States Patent
Lin et al.

(10) Patent No.: US 8,103,059 B2
(45) Date of Patent: Jan. 24, 2012

(54) LASER RANGEFINDER AND METHOD FOR DIGITAL SIGNAL PROCESSING THEREOF

(75) Inventors: Ing-Song Lin, Taichung (TW); Ye-Pin Chen, Taichung (TW)

(73) Assignee: Asia Optical Co., Inc., Tepz, Taichung (TW)

( * ) Notice: Subject to any disclaimer, the term of this patent is extended or adjusted under 35 U.S.C. 154(b) by 957 days.

(21) Appl. No.: 12/101,351

(22) Filed: Apr. 11, 2008

(65) Prior Publication Data

US 2008/0317477 A1    Dec. 25, 2008

(30) Foreign Application Priority Data

Jun. 25, 2007   (TW) .............................. 96122880 A

(51) Int. Cl.
*G06K 9/00*   (2006.01)

(52) U.S. Cl. ...................................... 382/106; 382/260

(58) Field of Classification Search ............... 340/855.5, 340/870.23, 870.24, 956, 970; 379/88.07, 379/406.06; 382/106, 260; 386/E9.005, 386/E9.032

See application file for complete search history.

(56) References Cited

U.S. PATENT DOCUMENTS 5,123,331 A * 6/1992 Hirai ........................... 91/363 A
5,790,241 A * 8/1998 Trussell, Jr. .................. 356/4.01

* cited by examiner

*Primary Examiner* — Gregory F Cunningham
(74) *Attorney, Agent, or Firm* — Thomas|Kayden

(57) ABSTRACT

A method for digital signal processing is disclosed. Reflected laser signals are received and digitized to generate corresponding digital signals. The digital signals are accumulated to generate an accumulated signal. A digital filtering operation is applied to the accumulated signal to generate a filtered signal. A maximum signal value for the filtered signal is found and a threshold value is set accordingly. It is determined whether the maximum signal value is less than the threshold value, and, if not, a distance value is calculated.

16 Claims, 3 Drawing Sheets

LASER RANGEFINDER AND METHOD FOR DIGITAL SIGNAL PROCESSING THEREOF

BACKGROUND OF THE INVENTION

1. Field of the Invention

The invention relates to a method for digital signal processing, and more particularly to a laser rangefinder and method for digital signal processing thereof.

2. Description of the Related Art

When range finding is implemented using a laser rangefinder, a received long range signal may be very weak and just slightly greater than a noise. If a predefined threshold value is too small, the noise may be mistakenly considered as a target signal. If a predefined threshold value is too large, the weak signal may not be detected.

Thus, the invention provides a method of digital signal processing for a laser rangefinder, enhancing the ranging ability by repeatedly accumulating received signals.

BRIEF SUMMARY OF THE INVENTION

The invention provides methods for digital signal processing. An exemplary embodiment of a method for digital signal processing comprises: (a) receiving x reflected laser signals wherein x is the number of laser pulses emitted; (b) converting the reflected laser signals to generate corresponding digital signals; (c) accumulating the digital signals to generate an accumulated signal; (d) applying a digital filtering operation to the accumulated signal to generate a filtered signal; (e) finding a maximum signal value for the filtered signal and setting a threshold value according to the accumulated signal; (f) determining whether the maximum signal value is less than the threshold value; and (g) if the maximum signal value is not less than the threshold value, calculating a distance value from the position where the maximum signal value locates.

Another embodiment of a method for digital signal processing comprises: (a) predefining a maximum number of laser emissions; (b) emitting a first set of laser signal; (e) receiving corresponding the first optical reflection signal of the first set of laser signal; (d) digitizing and accumulating the first optical reflected signal of the same measurement to generate a first digital signal; (e) digital filtering the first digital signal to generate a filtered signal; (f) finding a maximum signal value for the filtered signal and setting a threshold value according to the first digital signal; (g) determining whether the maximum signal value is less than the threshold value; (h) if the maximum signal value is not less than the threshold value, calculating a distance value from the position where the maximum signal value locates, and (i) if the number of laser pulse emitted is less than the predefined maximum number of laser emissions, repeat (b)~(h).

The invention further provides laser rangefinders. An exemplary embodiment of a laser rangefinder comprises a laser transmitter, a receiving module, a data processing unit, a filter, and a microprocessor. The laser transmitter sequentially emits laser signals. The receiving module receives reflected laser signals. The data processing unit digitizes and accumulates the reflected laser signals to obtain an accumulated signal. The filter applies a digital filtering operation to the accumulated signal to generate a filtered signal. The microprocessor finds a maximum signal value for the filtered signal, sets a threshold value according to the accumulated signal, determines whether the maximum pulse signal value is less than the threshold value, and, if not, calculates a distance value from the position where the maximum signal value locates.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
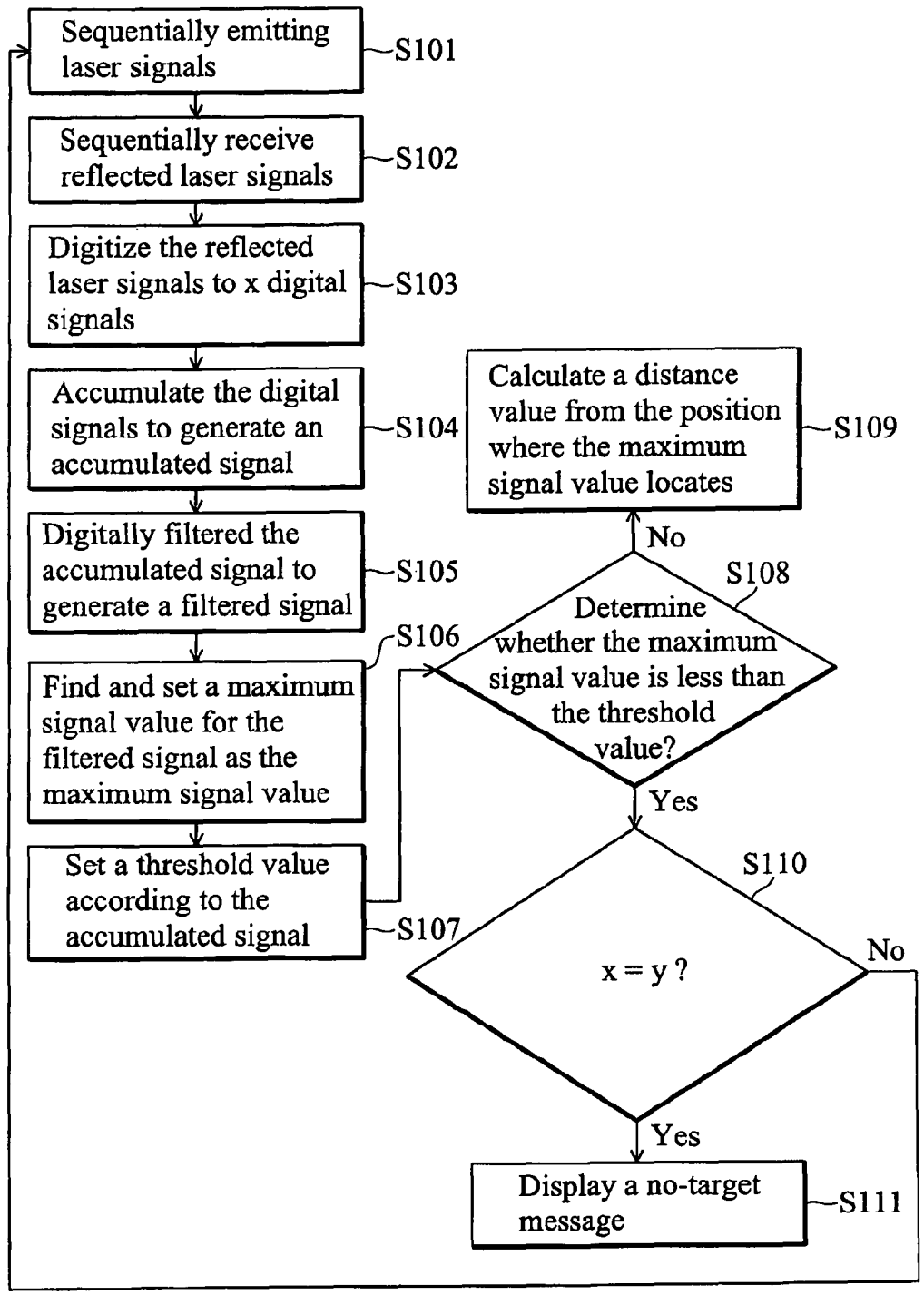
FIG. 1 is a flowchart of an embodiment of a method for digital signal processing for a laser rangefinder.

Several exemplary embodiments of the invention are described with reference to FIGS. 1 through 3, which generally relate to digital signal processing. It is to be understood that the following disclosure provides various different embodiments as examples for implementing different features of the invention. Specific examples of components and arrangements are described in the following to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a laser rangefinder and method for digital signal processing thereof.

An embodiment of a method for digital signal processing repeatedly accumulates received reflected laser signals to enhance range finding ability by gradually decreasing noise signals through accumulation averaging while holding signal intensity.

Analog signals cannot be easily accumulated and processed. Reflected laser signals should be first digitized to obtain corresponding digital signals. During signal digitization process, lesser quantization noise can be achieved by using ADC with greater number of bits. Greater ranging accuracy can be achieved by higher sampling rates. Meanwhile, digital signals can be easily processed to improve system performance using various signal processing methods.

As for multiple digital signals, signals are accumulated to obtain an accumulated signal. A threshold value is defined according to the accumulated signal. The accumulated signal is digitally filtered to generate a filtered signal, which is used to determine whether a target is detected and also gather statistical data about noise. An embodiment of the method locates the maximum value of the filtered signal to determine whether the maximum value is greater than the threshold value.

FIG. 1 is a flowchart of an embodiment of a method for digital signal processing for a laser rangefinder.

A maximum number of laser pulses emitted for a single measurement y (320, for example) is defined, and laser signals are sequentially emitted using a laser transmitter (step S101). Note that the maximum shooting number of times may be predefined. Next, reflected laser signals from a target are sequentially received (step S102). After emitting x laser pulses, x corresponding reflected laser signals, for example, are received. The reflected laser signals are digitized to x digital signals (step S103). All the digital signals are accumulated to generate an accumulated signal (step S104). The accumulated signal is digitally filtered to generate a filtered signal (step S105).

Next, a maximum signal value for the filtered signal is found and set as the maximum signal value (step S106), and a threshold value is set according to the accumulated signal (step S107). It is determined whether the maximum signal value is less than the threshold value (step S108), and, if not, a distance value is calculated from the position where the maximum signal value locates (step S109). If the maximum signal value is less than the threshold value, it is then determined whether x=y (step S110), and, if so, a no-target message is displayed (step S111), and, if x<y, laser signals are emitted again to repeat steps S101~S110.

In FIG. 1, the threshold value is obtained according to the accumulated signals.

In another embodiment, whenever a laser signal is shot, a threshold value is calculated according to a corresponding reflected laser signal and the previously received reflected laser signal.

Figure 2:
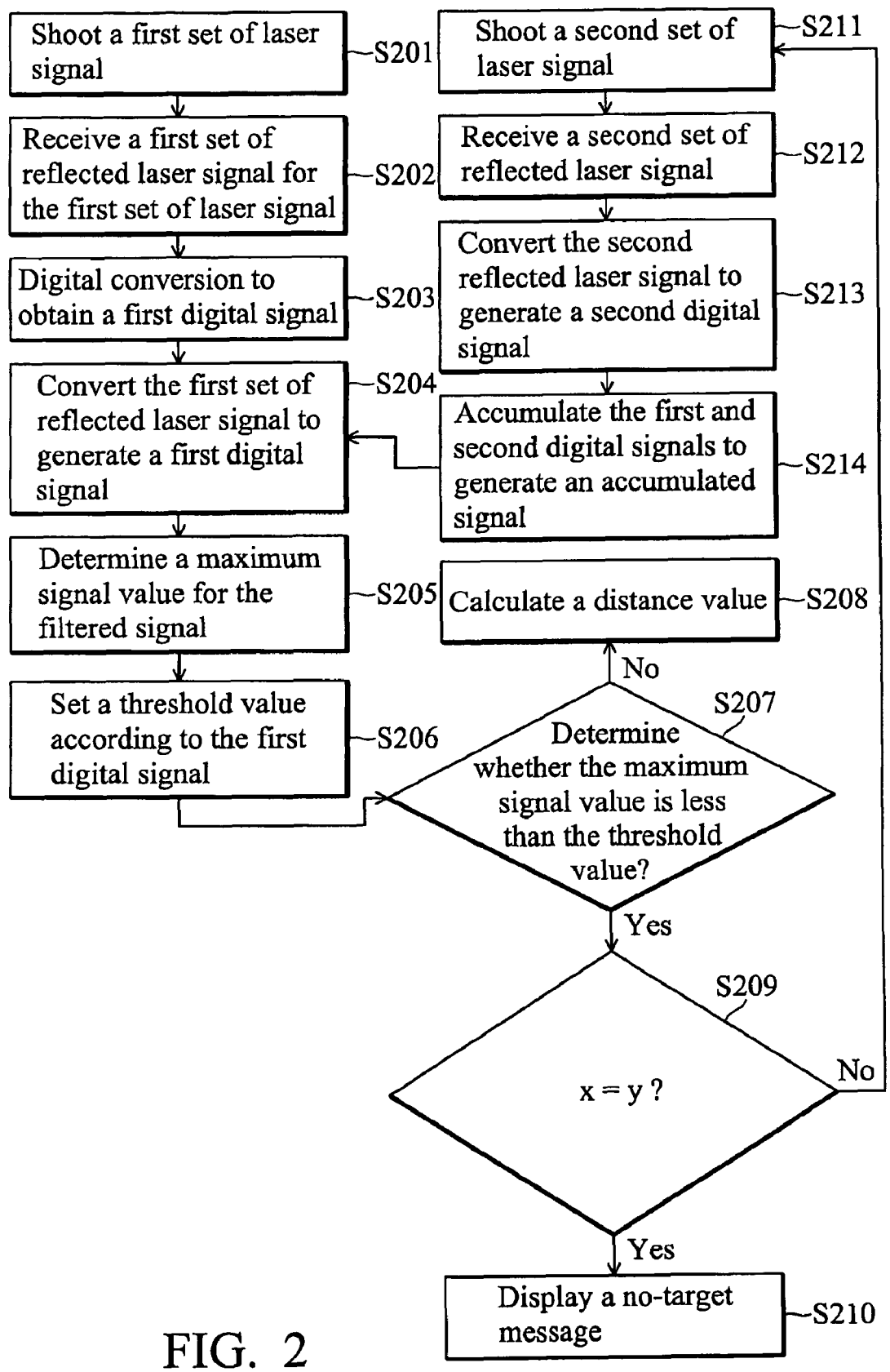
FIG. 2 is a flowchart of another embodiment of a method for digital signal processing for a laser rangefinder.

FIG. 2 is a flowchart of another embodiment of a method for digital signal processing for a laser rangefinder.

A maximum number of laser pulses emitted for a single measurement y is defined, and a first set of laser signal is shot using a laser transmitter (step S201). Next, a first set of reflected laser signal for the first set of laser is received (step S202) and is converted to generate a first digital signal (step S203). The first digital signal is digitally filtered to generate a filtered signal (step S204).

Next, a maximum signal value for the filtered signal is determined (step S205) and a threshold value is set according to the first digital signal (step S206). The threshold value is calculated based on noise data N of the filtered signal.

It is determined whether the maximum signal value is less than the threshold value (step S207), and, if not, a distance value is calculated from the position where the maximum number locates (step S208). If the maximum signal value is less than the threshold value, it is then determined whether x (the number of laser pulses already emitted)=y (the maximum number of emitted laser pulses for a single measurement) (step S209), and, if so, a no-target message is displayed (step S210), and, if x<y, a second set of laser signal is shot (step S211) and a second set of reflected laser signal is received (step S212). The second reflected laser signal is again converted to generate a second digital signal (step S213). The first and second digital signals for a single measurement are accumulated to generate an accumulated signal (step S214), and the process repeats from step S204.

The digital filtering implementation process is further described as follows.

Moving averages can be applied to improve the reduction in target accuracy by maximum value selection. Specifically, a strong reflection signal is found when reflecting from a nearby target. By applying moving averages, avoiding the reduction of signal accuracy generated by simply selecting maximum values.

Also, from the knowledge of laser pulse waveform recorded in development stage, a digital filter, such as a matched filter, can be used to achieve best signal-to-noise ratio (S/N).

Additionally, interpolation can be applied to enhance the measure accuracy of digital data. As mentioned earlier, the ranging accuracy is related to the sampling rate of digitizing process. The higher sampling rate, the higher ranging accuracy. Because the performance limitation of ADC devices available, the sampling rate can not be increased arbitrary. In this case, interpolation techniques can be used to generate more data points, and thus increase the ranging accuracy. Also, fixed pattern noise can be obtained by pre-recording accumulated signals with out target signal, and is later removed from true target measurement process to further improve system performance.

Meanwhile, the described threshold value can be obtained according to the accumulated signals or filtered signals, and it is determined whether a target is detected according to the obtained threshold value. The threshold value calculation comprises the following.

First, the threshold value may be a constant. When the maximum signal value of the accumulated signal is greater than the threshold value, a target signal is detected.

Second, the threshold value is represented by a first function $f(x)$ where x is the number of laser pulse signals emitted. When signals are accumulated, although the threshold value increases, the result of the threshold value divided by the number of laser pulse signals emitted. When $x1>x2$, for example, $f(x1) \geq f(x2)$ and $[f(x1)/x1] \leq [f(x2)/(x2)]$.

Third, the noise data N is calculated according to the accumulated signal and the threshold value is set as a fixed multiple of the noise data N above average value M. The threshold value is a second function $g(x)$ based on the noise data N. The second function $g(x)=M+k \times N$, where M represents an average value of the accumulated signal, $$M = \frac{1}{n}\sum_{i=1}^{n} Acc(i),$$

k is a predefined parameter, Acc(i) represents accumulated data value at position i, and n represents the number of all possible target positions. Further, the noise data N is equal to the root-mean-square value $$\left(N = \sqrt{\frac{1}{n}\sum (Acc(i) - M)^2}\right)$$

or the mean divergence value $$\left(N = \frac{1}{n}\sum |Acc(i) - M|\right)$$

by subtracting M from the accumulated signal.

Fourth, the threshold value is calculated based on the second function $g(x)=M+k'(x) \times N$, where $k'(x)$ is a function of x which is the number of laser emissions. k' decreases when x increases. Accordingly, if $x1<x2$, $k'(x1)>k'(x2)$.

An embodiment of a method for digital signal processing enhances the range finding ability of a laser rangefinder. A long range signal received by the laser rangefinder may be very weak and just slightly greater than a noise. If the threshold value is small, the noise may be mistakenly considered as a target signal. Conversely, if the threshold value is large, weak signals can not be detected. The noise occurs randomly and is gradually reduced during repeated accumulation/averaging process, while accumulated target signals get stronger. The method for digital signal processing by the invention improves the quality and strength of received signals by repeatedly accumulating received signals.

Attachments are provided to specifically illustrate the method for digital signal processing.

Attachment 1 illustrates digitizing received reflected laser signals by simple comparator (1 bit ADC). It can be easily seen that more than one target pulses are detected. Only one is the true target, and others are false targets.

In attachment 2, 320 reflected laser signals are received, digitized and represented as an image, wherein the longitudinal axis represents each reflected laser signal set and the horizontal axis represents time (in unit of sampling period). In the image, possible targets are represented by white points which are generated from target signals or noise. False targets from noise appear randomly and target pulse appears at the same position. Accordingly, in the signal set shown in Attachment 2, the dotted vertical line represents the true target.

Attachment 3 illustrates directly accumulating 320 reflected laser signals, wherein the maximum signal value of the accumulated signal represents the target signal. Further, it is illustrated that the minimum signal value occurs after the target signal due to the characteristics of an analog filter and this information can also be used to confirm targets. Meanwhile, the shape of target signal is related to the laser transmitting and receiving circuits and this information can be used to design an appropriate digital filter (match filter) to achieve best signal-to-noise ratio.

Attachment 4 illustrates target positions obtained without digital filtering processes. Vertical axis is the target position and the horizontal axis is the number of experiments (total 500 experiments are performed).

Attachment 5 illustrates target positions obtained by adding a moving average filter in the detection process. Compared with Attachment 4, a portion of noise is filtered out by the digital filter and the measure error is reduced.

Attachment 6 illustrates accumulated signals that may be generated when receiving strong reflection signals, as the position of target signals is difficult to decide due to the accumulated signal comprising multiple maximum signal values.

Attachment 7 illustrates the maximum signal value being averaged following implementation of moving averages to the accumulated signals shown in Attachment 6. It can be noted that the maximum position is now easier to find.

Note that if a circuit layout is not carefully done, some fixed pattern noises may occur. When reflected laser signals are digitally processed, waveforms of the fixed pattern noises can be first measured before digitalized signals are being generated. Practically, corresponding fixed pattern noises can be subtracted from the accumulated results, to further improve range ability.

Figure 3:
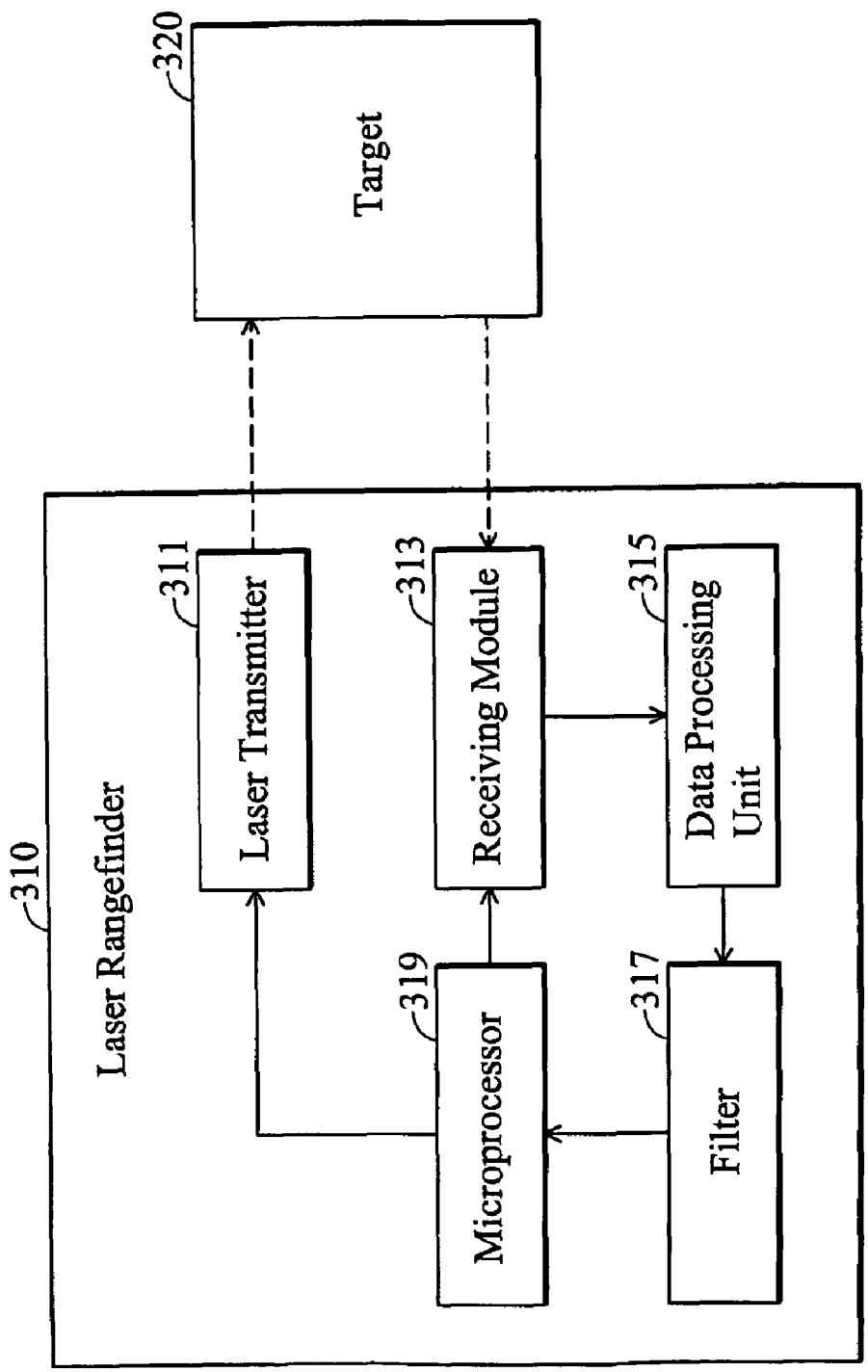
FIG. 3 is a schematic view of an embodiment of a laser rangefinder.

FIG. 3 is a schematic view of an embodiment of a laser rangefinder.

Laser rangefinder 310 comprises a laser transmitter 311, a receiving module 313, a data processing unit 315, a filter 317, and a microprocessor 319. Laser transmitter 311 defines a maximum number y of laser pulses emitted for a single measurement and sequentially shoots laser signals. When x laser pulses are emitted, receiving module 313 also receives x reflected laser signals from target 320. Data processing unit 315 digitally converts and accumulates all reflected laser signals of the same measurement to obtain an accumulated signal. Filter 317 implements a digital filtering operation to the accumulated signal to generate a filtered signal. Microprocessor 319 finds a maximum signal value for the filtered signal, sets a threshold value according to the accumulated signal, determines whether the maximum signal value is less than the threshold value, and, if not, calculates a distance value. If so, additional laser pulses are emitted, and the previous described processes are repeated until the number of emitted laser pulses x is greater or equal to the maximum number y. Further, an operational program can also be internally installed in microprocessor 319 to implement accumulation and filtering operations to the reflected laser signals by software applications.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for digital signal processing, comprising:
   (a) sequentially emitting x signals and receiving the reflected signals;
   (b) digitizing the reflected signals to corresponding digital signals;
   (c) accumulating the digital signals to generate an accumulated signal;
   (d) applying a digital filtering operation to the accumulated signal to generate a filtered signal;
   (e) finding a maximum signal value for the filtered signal and setting a threshold value according to the accumulated signal;
   (f) determining whether the maximum signal value is less than the threshold value; and
   (g) if the maximum signal value is not less than the threshold value, calculating a distance value;
   wherein the threshold value is represented by a first function $f(x)$, wherein, if $x1 > x2$, $f(x1) \geq f(x2)$ then $[f(x1)/x1] \leq [f(x2)/(x2)]$.

2. The method for digital signal processing as claimed in claim 1, wherein the step (a) further comprises:
   (a1) predefining a maximum number of emitting pulses y; and
   (a2) sequentially emitting signals for the reflection signals.

3. The method for digital signal processing as claimed in claim 2, wherein, when the number of emitting signals x is equal to the maximum emitting signals y and the maximum signal value is less than the threshold value, then displaying a no-target message.

4. The method for digital signal processing as claimed in claim 1, wherein the step (e) further comprises calculating noise data N according to the accumulated signal and setting the threshold value as a second function $g(x) = M + k \times N$ based on the noise data N, where M represents an average value of the accumulated signal and k is a predefined parameter.

5. The method for digital signal processing as claimed in claim 4, wherein the noise data N is a root-mean-square value or a mean absolute difference value of the accumulated signal minus the average value M.

6. The method for digital signal processing as claimed in claim 4, wherein $g(x)=M+k(x)\times N$, $k(x)$ is a function of the number of emitting laser pulses x, and $k(x1)\leq k(x2)$ if $x1>x2$.

7. The method for digital signal processing as claimed in claim 1, wherein the step (d) implements the digital filtering operation to the accumulated signal using a moving average method.

8. The method for digital signal processing as claimed in claim 1, wherein the step (c) further comprises:
(c1) subtracting fixed pattern noise from the accumulated signal to obtain a correct signal for the accumulated signal and implementing the digital filtering operation according to the correct signal.

9. A method for digital signal processing, comprising:
(a) predefining a maximum number of emitting laser pulses y;
(b) shooting a first laser signal;
(c) receiving a first reflected laser signal corresponding to the first laser signal;
(d) digitizing and accumulating the first reflected laser signal to generate a first digital signal;
(e) applying a digital filtering operation to the first digital signal to generate a filtered signal;
(f) finding a maximum signal value for the filtered signal and setting a threshold value is according to the first digital signal;
(g) determining whether the maximum impulse signal value is less than the threshold value; and
(h) if the maximum impulse signal value is not less than the threshold value, calculating a distance value;
wherein the step (g) further comprises:
(g1) if the maximum signal value is less than the threshold value, and the number of laser pulses emitting x is equal to the maximum number of emitting laser pulses y, displaying a no-target message;
(g2) if the number of laser pulses emitting x is less than the maximum number of emitting laser pulses y, shooting a second laser signal and correspondingly receiving a second optical reflected laser signal;
(g3) digitizing and accumulating the second reflected laser signal to generate a second digital signal; and
(g4) accumulating the first and second digital signals to obtain an accumulated signal and repeating the steps (e)~(h).

10. The method for digital signal processing as claimed in claim 9, further comprising calculating noise data N according to the accumulated signal and setting the threshold value as a function $g(x)=M+k\times N$ based on the noise data N, where M represents an average value of the accumulated signal and k is a predefined parameter.

11. The method for digital signal processing as claimed in claim 10, wherein the noise data N is the root-mean-square value or the mean absolute difference value of the accumulated signal minus the average value M.

12. The method for digital signal processing as claimed in claim 11, wherein $g(x)=M+k(x)\times N$, $k(x)$ is a function of the number of emitting laser pulses x, and $k(x1)\leq k(x2)$ if $x1>x2$.

13. The method for digital signal processing as claimed in claim 9, further comprising implementing the digital filtering operation to the accumulated signal using a moving average method.

14. A laser rangefinder, comprising:
a laser transmitter, sequentially emitting laser signals;
a receiving module, receiving reflected laser signals;
a data processing unit, digitally converting and accumulating the reflected laser signals to obtain an accumulated signal;
a filter, applying a digital filtering operation to the accumulated signal to generate a filtered signal;
a microprocessor, determining a maximum signal value for the accumulated signal, setting a threshold value according to the filtered signal, and determining whether the maximum pulse signal value is less than the threshold value, and, if not, calculating a distance value;
wherein the threshold value is represented by a first function f(x), (a function of the number of emitting laser pulses x), wherein, if $x1>x2$, $f(x1)\geq f(x2)$ and $[f(x1)/x1]\leq[f(x2)/(x2)]$.

15. The laser rangefinder as claimed in claim 14, wherein the microprocessor further calculating noise data N according to the accumulated signal and sets the threshold value as a second function $g(x)=M+k(x)\times N$ based on the noise data N, where M represents an average value of the accumulated signal and k(x) represents a predefined parameter, wherein $k(x1)\leq k(x2)$ if $x1>x2$.

16. The laser rangefinder as claimed in claim 14, wherein the filter further subtracts fixed pattern noise from the accumulated signal to obtain a correct signal for the accumulated signal and implementing the digital filtering operation according to the correct signal.

* * * * *